Jan. 5, 1932.   V. R. RABY ET AL   1,839,587
ATTACHMENT FOR MOTION PICTURE CAMERAS
Filed March 7, 1928   2 Sheets-Sheet 1

INVENTOR.
VICTOR R. RABY
BY DWIGHT W. WARREN
R. W. Smith
ATTORNEY.

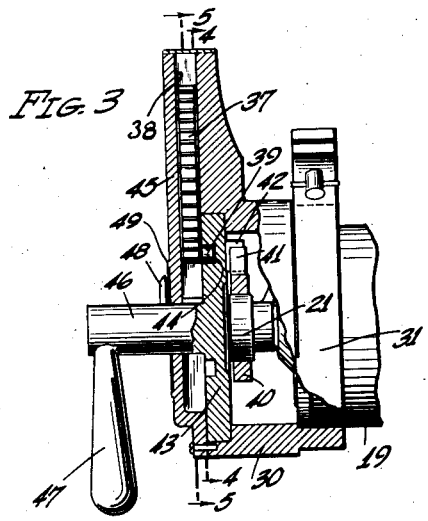
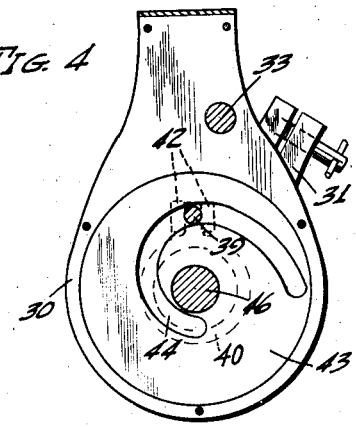
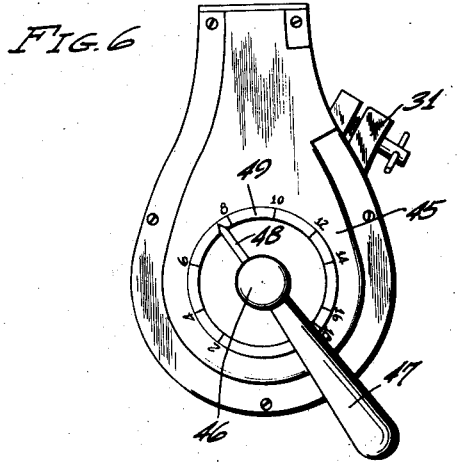
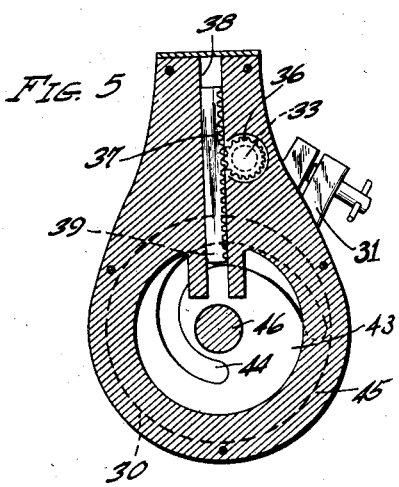
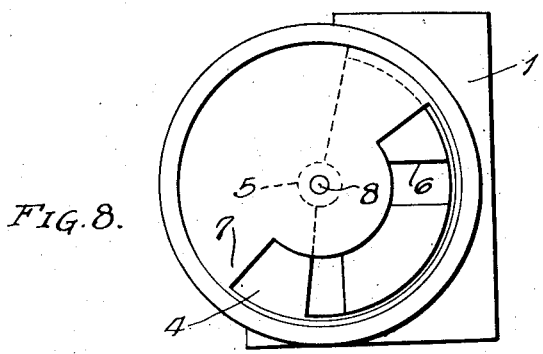

Patented Jan. 5, 1932

1,839,587

UNITED STATES PATENT OFFICE

VICTOR R. RABY AND DWIGHT W. WARREN, OF LOS ANGELES, CALIFORNIA

ATTACHMENT FOR MOTION PICTURE CAMERAS

Application filed March 7, 1928. Serial No. 259,652.

This invention relates to motion picture cameras and more particularly to means for adjusting the shutter opening of a camera so as to insure admittance of light to the film for a uniform time interval irrespective of changes in the speed of the shutter.

It is an object of the invention to provide automatic means whereby changing the speed of rotation of the shutter will cause exactly corresponding proper adjustment of the shutter opening to maintain a uniform interval of exposure, it being understood that in certain camera work, particularly the filming of trick pictures, it is often desirable to reduce the camera speed below the normal 16 exposures to the second so that when the resulting films is projected at normal speed the action of the picture will be materially accelerated, but that such reduction in the shutter speed increases the interval of time during which light is admitted to the film unless the shutter opening is correspondingly restricted. Heretofore adjustment of the shutter opening has been accomplished entirely independently of the adjustment of the shutter speed, the operator relying upon his dexterity and skill to synchronize and maintain the proper relation between these two adjustments so as to produce uniform density of negatives.

By means of the present invention the shutter opening is automatically adjusted strictly in accordance with the shutter speed so as to maintain the exposure period absolutely uniform, the construction providing a complete chain of mechanically operated apparatus which dispenses entirely with human inaccuracies.

It is a further object of the invention to adapt the invention for use in connection with a motor driven camera, so that it will operate the shutter opening control in accordance with the motor speed control and thereby maintain the same interval of exposure at all camera speeds irrespective of the rapidity of the speed changes. With the usual motor driven camera successive uniform changes in the shutter speed are produced by non-uniform adjustments of the motor control, and the corresponding proper variations in the shutter opening are also obtained by non-uniform adjustments of the shutter opening control; and it is therefore a part of this invention to so arrange the operating connection between the controls for the motor speed and the shutter opening as to compensate for such non-uniformity in their successive adjustments and thereby accurately adjust the shutter opening strictly in accordance with the camera speed.

It is a still further object of the invention to arrange the operating connection between the camera speed control and the shutter adjusting control so that it may be readily mounted in operative position and as readily removed without disturbing or necessitating alerations in a usual camera construction, with the invention also providing a construction which is extremely durable but accurate in its operation, and which may be simply but positively operated to instantly product any desired camera speed and the exactly corresponding adjustment of the shutter for assuring uniform exposure.

Further objects of the invention will be readily understood from the following description of the accompanying drawings, in which:

Fig. 3 is a fragmentary vertical section through the attachment showing the mounting for the same.

Figs. 4 and 5 are transverse sections on the lines 4—4 and 5—5 of Fig. 3.

Fig. 6 is a rear elevation of the attachment.

Figure 1:
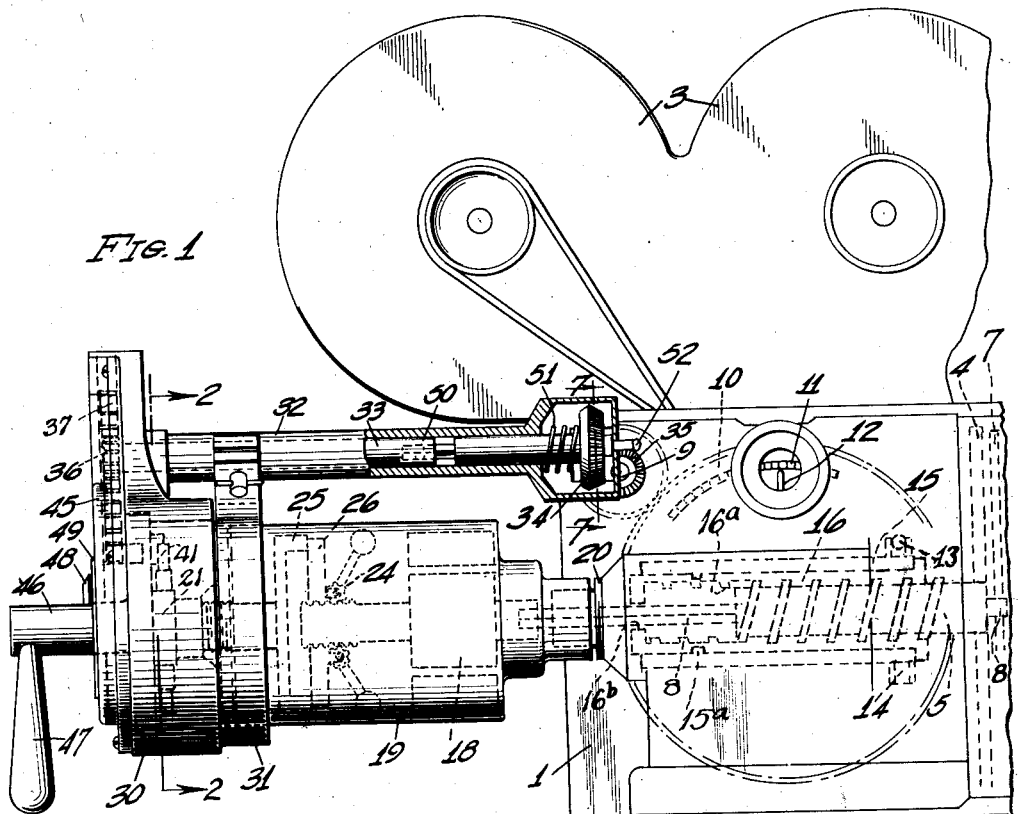
Fig. 1 is a side elevation of a camera provided with the improved attachment.
Figure 2:
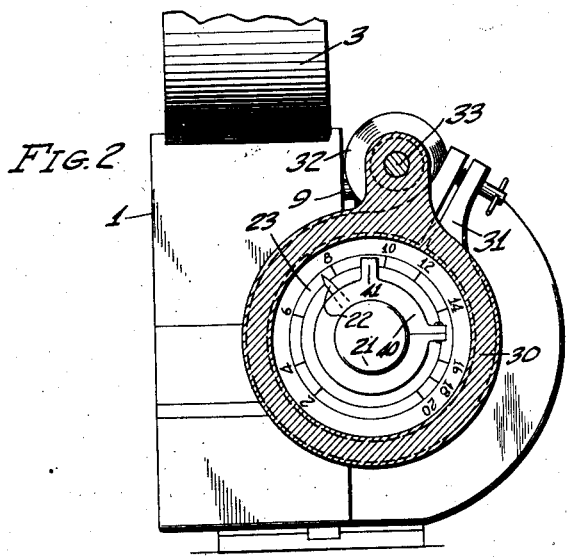
Fig. 2 is a transverse section on the line 2—2 of Fig. 1.
Figure 7:
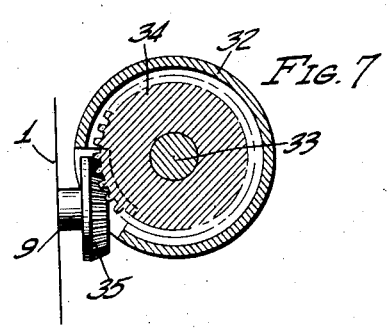

Fig. 7 is a detail section on the line 7—7 of Fig. 1.

Fig. 8 is a front elevation of the camera.

We have illustrated the attachment as mounted on a usual motor-driven camera of standard and well-known construction, but it will be readily apparent that the invention may be adapted to any camera which has a speed-change control and a control for adjusting the shutter opening, the invention providing an operating connection between such controls whereby the shutter opening will be adjusted strictly in accordance with changes in the shutter speed.

In the drawings, camera 1 is mounted on tripod 2 and supports the film magazines 3. The camera shutter 4 is mounted on a shaft 5 and is adapted for rotation to control the photography aperture 6 in usual manner. The shutter is radially slotted to provide a fixed maximum shutter opening which is adjustable in well known manner by means of an auxiliary radially slotted disc 7 overlying shutter 4 and adapted to rotate with the shutter and also arranged for relative turning of the shutter and disc in order to vary the size of the exposure slot in the shutter.

The auxiliary disc 7 changes the size of the opening in the principal shutter disc 4 when such change is required to maintain a uniform period of exposure, as for example when the shutter speed is changed for making trick pictures. The mechanism for turning disc 7 with relation to shutter 4 in order to vary the size of the exposure slot is indicated in Fig. 1 as of a usual well known and practically standard construction, and comprises a shaft 8 having the disc 7 fixed thereon, with said shaft extending through the shaft 5 which is hollow. A bushing 16 overlies shafts 5 and 8 and has a worm engagement 16$^a$ with the shaft 5, and the shaft 8 and the bushing 16 are adapted to turn together while permitting axial adjustment of the bushing with relation to shaft 8. For this purpose the shaft 8 which is non-circular in cross-section projects through a correspondingly non-circular bore 16$^b$ in the end of bushing 16. The bushing 16 is journaled in an axially slidable bushing 15 and is adapted for axial movement with the bushing 15 by means of a cooperating annular groove and key connection 15$^a$.

As a result of the construction as thus described the bushing 16 rotating with shaft 8 provides a rotary driving connection for shaft 5 by means of the worm 16$^a$, thereby rotating shutter 4 and disc 7 as a unit, and by axially shifting the bushing 15 and thus correspondingly axially shifting the bushing 16, the shaft 5 is turned with relation to the bushing 16 by means of worm 16$^a$, so as to rotatably adjust the disc 7 with relation to shutter 4 for any desired adjustment of the exposure slot of the shutter. The bushing 15 is axially shifted for thus adjusting the shutter opening, by turning a pinion shaft 9 which has been heretofore adapted for manual rotation. This operating connection may include a disc 10 rotated by pinion 9 and having scale markings 11 indicating at the index 12 the time of film exposure at normal speed in its relation to the degree of opening in the shutter, and the disc 10 carries a roller 13 which is received in a guide 14 mounted on the bushing 15, so that the roller is adapted to axially shift the bushing for causing relative rotation of shafts 5 and 8 in accordance with the turning of shaft 9.

The camera is operated in usual well known manner by an electric motor 18 housed in a casing 19 which may be attached to the end of the housing 20 for the shaft 8, so that the motor drives said shaft for rotating the shutter as has been described, and variable shutter speeds are obtained by the manipulation of a control knob 21 projecting from the rear end of the motor housing and carrying a pointer 22 which traverses a calibrated dial 23 indicating pictures exposed per second, preferably ranging from 2 to 20 and upward. The motor may be controlled by a centrifugal governor 24 which is adjusted to change the motor speed by turning knob 21 so that a brake 25 carried by the threaded shank of the knob engages a rotatable plate 26 which is axially shifted by the governor.

The attachment forming the present invention provides an operating connection between speed control knob 21 and the pinion 9 which controls adjustment of the shutter opening, and since as a result of the brake and governor control for the motor, the adjustments of knob 21 to produce uniform speed changes are non-uniform turning movements of the knob, and uniform adjustments of the shutter opening are obtained by non-uniform turning movement of pinion 9 as a result of the roller and guide driving connection 13—14, it will be apparent that the operating connection between knob 21 and pinion 9 must be so arranged as to compensate for such non-uniform movements of these controls in order to adjust the shutter opening exactly in accordance with the shutter speed.

In order to compensate for such variations in the movement of controls 21 and 9, the operating connection between these parts may include a cam mechanism so designed as to provide the necessary varying drive; and as an instance of this arrangement the cam may be rotated by control knob 21 and variably shift a rack which meshes with a pinion mounted on a shaft operatively engaging the control 9. Such an operating connection is illustrated as mounted in a housing 30 having a clamping ring 31 adapted to detachably engage the end of the motor casing 19, and a hollow bearing 32 projects from housing 30 so that its forward end overlies the control shaft 9 which extends outwardly through the side of the camera casing.

A shaft 33 is journaled in bearing 32 and at its forward end has a bevel gear 34 adapted to mesh with a bevel gear 35 on the shaft 9, and at its rear end the shaft 33 carries a pinion 36 projecting into housing 30 and engaged by a rack 37 which is guided in a radial slot 38 in the housing. The inner end of the rack carries a projecting roller 39 which is engaged by a cam. The cam mechanism includes an annulus 40 detachably clamped on control knob 21 and having a radially projecting lug 41, and this lug projects between abutments 42 on a disc 43 which is journaled in housing 30, with the outer face of the disc provided with a cam slot 44 in which roller 39 is received.

A cover plate 45 overlies the outer end of housing 30 for maintaining the parts in assembled relation, and an operating shaft 46 for disc 43 projects through the cover plate and has a handle 47 and an indicator 48. The indicator traverses a dial 49 on the cover plate, and this dial is calibrated to correspond exactly with the calibrations of the dial 23 which indicates the various shutter speeds.

By the construction as thus described it will be seen that turning shaft 46 so that indicator 48 points to a desired shutter speed, will correspondingly rotate disc 43 so that abutments 42 engage lug 41 and thereby similarly rotate control knob 21 to produce the corresponding motor speed which is transmitted through shaft 8 to the shutter 4. At the same time the cam slot 44 through its engagement with roller 39 reciprocates rack 37 which thus rotates pinion 36 and its shaft 33 so that the bevel gears 34—35 turn the control shaft 9 for adjusting the shutter opening. As a result of its cam construction as shown in Fig. 4, the slot 44 provides a varying driving connection, and the cam is designed in accordance with such variations in the turning movements of both control 21 and control 9 as are adapted to produce uniform adjustment of the shutter speed and the shutter opening, so as to turn control shaft 9 exactly the proper distance to adjust the shutter opening in accordance with the shutter speed and thereby uniformly maintain the proper period of exposure which is necessary to produce desired density of negatives.

We have thus provided an extremely simple but practical attachment whereby changing the shutter speed of a camera will automatically and instantaneously cause an exactly corresponding proper adjustment of the shutter opening without reliance upon the human element and its accompanying variations and errors, and we have also provided a device which may be readily attached to a camera by simply clamping the rings 31 and 40 on the motor casing 19 and on the control knob 21 respectively. When mounting the attachment it is desirable that bevel gear 34 be readily disengageable from its meshing gear 35 so that shafts 33 and 9 may be initially rotated to their proper relative position as indicated by index 12 and indicator 48. For this purpose the shaft 33 preferably includes a telescopic driving connection 50 and a spring 51 normally extends the shafts so that gears 34 and 35 are in engagement, and a push pin 52 preferably projects beyond gear 34 and is adapted to be manually retracted when the attachment is first mounted on the camera, in order to telescope shaft 33 against the action of its spring and thereby disengage gears 34—35 until shafts 33 and 9 have been so adjusted as to provide the proper relation of the parts, whereupon the pin 52 is released to permit meshing engagement of the bevel gears.

We claim:

1. An attachment for a motor driven motion picture camera of that type which includes a shutter, a disc adapted for rotation with the shutter and also adapted for relative turning of the shutter and disc to vary the size of the shutter opening, a shutter opening control adapted to vary said relative turning of the shutter and disc, a shaft for dependently rotating the shutter and disc, a motor for rotating the shaft, and a control for varying the motor speed; the said attachment comprising a manually movable member, means for adjusting the motor speed control by movement of said member, a cam carried by said member, a rotatable shaft, means for rotating the shaft by movement of the cam, and means for adjusting the shutter opening control by rotation of the shaft so as to vary the shutter opening in accordance with the shutter speed.

2. An attachment for a motor driven motion picture camera of that type which includes a shutter, a disc adapted for rotation with the shutter and also adapted for relative turning of the shutter and disc to vary the size of the shutter opening, a shutter opening control adapted to vary said relative turning of the shutter and disc, a shaft for dependently rotating the shutter and disc, a motor for rotating the shaft, and a control for varying the motor speed; the said attachment comprising a manually movable member, means for adjusting the motor speed control by movement of said member, a cam carried by said member, a rotatable shaft, a rack and pinion connection for rotating the shaft by movement of the cam, and means for adjusting the shutter opening control by rotation of the shaft so as to vary the shutter opening in accordance with the shutter speed.

3. An attachment for a motor driven motion picture camera of that type which includes a shutter, a disc adapted for rotation with the shutter and also adapted for relative turning of the shutter and disc to vary the size of the shutter opening, a shutter opening control adapted to vary said relative turning of the shutter and disc, a shaft for dependently rotating the shutter and disc, a motor for rotating the shaft, and a control for varying the motor speed; the said attachment comprising a manually rotatable member, means for adjusting the motor speed control by rotation of said member, a cam slot in said member, a rack having a projection received in the cam slot, a rotatable shaft, and a pinion fixed on the rotatable shaft and meshing with the rack for rotating the shaft by manual rotation of the said member, and means for adjusting the shutter opening control by rotation of the shaft so as to vary the shutter opening in accordance with the shutter speed.

4. An attachment for a motor driven motion picture camera of that type which includes a shutter, a disc adapted for rotation with the shutter and also adapted for relative turning of the shutter and disc to vary the size of the shutter opening, a shutter opening control adapted to vary said relative turning of the shutter and disc, a shaft for dependently rotating the shutter and disc, a motor for rotating the shaft, and a control for varying the motor speed; the said attachment comprising a rotatable shaft, a normally engaged operating connection for adjusting the shutter opening control by rotation of the shaft, a manually movable member, means for adjusting the motor speed control by movement of said member, means for rotating the shaft by movement of said member so as to vary the shutter opening in accordance with the shutter speed, and means for disengaging the operating connection between the rotatable shaft and the shutter opening control without disturbing the shaft rotating means, said disengagement permitting relative adjustment of the rotatable shaft and the shutter opening control.

5. An attachment for a motor driven motion picture camera of that type which includes a shutter, a disc adapted for rotation with the shutter and also adapted for relative turning of the shutter and disc to vary the size of the shutter opening, a shutter opening control adapted to vary said relative turning of the shutter and disc, a shaft for dependently rotating the shutter and disc, a motor for rotating the shaft, and a control for varying the motor speed; the said attachment comprising a rotatable shaft, an operating connection for adjusting the shutter opening control by rotation of the shaft, a manually movable member, means for adjusting the motor speed control by movement of said member, means for rotating the shaft by movement of said member so as to vary the shutter opening in accordance with the shutter speed, the rotatable shaft being a spring projected telescopic structure normally causing engagement of the operating connection between the shaft and the shutter opening control, and means for manually retracting the telescopic shaft so as to disengage said operating connection for initial relative adjustment of the rotatable shaft and the shutter opening control.

6. An attachment for a motor driven motion picture camera of that type which includes a shutter, a disc adapted for rotation with the shutter and also adapted for relative turning of the shutter and disc to vary the size of the shutter opening, a shutter opening control for relatively turning the shutter and disc so that predetermined adjustments of the control will cause predetermined variations in the size of the shutter opening, a shaft for dependently rotating the shutter and disc, a motor for rotating the shaft, and a control for regulating the motor speed so that predetermined adjusments of said motor speed control will cause predetermined variations in the shutter speed; the said attachment comprising a manually movable member, means for making said predetermined adjustments of the motor speed control by predetermined movements of the manually movable member, and means for making said predetermined adjustments of the shutter opening control by said predetermined movements of the manually movable member so as to vary the shutter opening in accordance with the shutter speed.

7. An attachment for a motor driven motion picture camera of that type which includes a shutter, a disc adapted for rotation with the shutter and also adapted for relative turning of the shutter and disc to vary the size of the shutter opening, a shutter opening control for relatively turning the shutter and disc so that predetermined adjustments of the control will cause predetermined variations in the size of the shutter opening, a shaft for dependently rotating the shutter and disc, a motor for rotating the shaft, and a control for regulating the motor speed so that predetermined non-uniform adjustments of said motor speed control will cause predetermined uniform variations in the shutter speed; the said attachment comprising a manually movable member, means for making said predetermined non-uniform adjustments of the motor speed control by predetermined movements of the manually movable member, and means for making said predetermined adjustments of the shutter opening control by said predetermined movements of the manually movable member so as to vary the shutter opening in accordance with the shutter speed.

8. An attachment for a motor driven motion picture camera of that type which includes a shutter, a disc adapted for rotation with the shutter and also adapted for relative turning of the shutter and disc to vary the size of the shutter opening, a shutter opening control for relatively turning the shutter and disc so that predetermined non-uniform adjustments of the control will cause predetermined uniform variations in the size of the shutter opening, a shaft for dependently rotating the shutter and disc, a motor for rotating the shaft, and a control for regulating the motor speed so that predetermined adjustments of said motor speed control will cause predetermined variations in the shutter speed; the said attachment comprising a manually movable member, means for making said predetermined adjustments of the motor speed control by predetermined movements of the manually movable member, and means for making said predetermined non-uniform adjustments of the shutter opening control by said predetermined movements of the manually movable member so as to vary the shutter opening in accordance with the shutter speed.

9. An attachment for a motor driven motion picture camera of that type which includes a shutter, a disc adapted for rotation with the shutter and also adapted for relative turning of the shutter and disc to vary the size of the shutter opening, a shutter opening control for relatively turning the shutter and disc so that predetermined non-uniform adjustments of the control will cause predetermined uniform variations in the size of the shutter opening, a shaft for dependently rotating the shutter and disc, a motor for rotating the shaft, and a control for regulating the motor speed so that predetermined non-uniform adjustments of said motor speed control will cause predetermined uniform variations in the shutter speed; the said attachment comprising a manually movable member, means for making said predetermined non-uniform adjustments of the motor speed control by corresponding non-uniform movements of the manually movable member, and means for making said predetermined non-uniform adjustments of the shutter opening control by said non-uniform movements of the manually movable member so as to vary the shutter opening in accordance with the shutter speed.

10. An attachment for a motor driven motion picture camera of that type which includes a shutter, a disc adapted for rotation with the shutter and also adapted for relative turning of the shutter and disc to vary the size of the shutter opening, a shutter opening control adapted to vary said relatively turning of the shutter and disc, a shaft for dependently rotating the shutter and disc, a motor for rotating the shaft, and a control for varying the motor speed; the said attachment comprising a manually movable member, means for adjusting the motor speed control by movement of said member, and means for adjusting the shutter opening control by said movement of the manually movable member so as to vary the shutter opening in accordance with the shutter speed.

11. An attachment for a motor driven motion picture camera of that type which includes a shutter, a disc adapted for rotation with the shutter and also adapted for relative turning of the shutter and disc to vary the size of the shutter opening, a shutter opening control adapted to vary said relative turning of the shutter and disc, a shaft for dependently rotating the shutter and disc, a motor for rotating the shaft, and a control for varying the motor speed; the said attachment comprising a manually movable member, means for adjusting the motor speed control by movement of said member, an actuating element, means for actuating said element by movement of the manually movable member, and means for adjusting the shutter opening control by actuation of said element so as to vary the shutter opening in accordance with the shutter speed.

12. An attachment for a motor driven motion picture camera of that type which includes a shutter, a disc adapted for rotation with the shutter and also adapted for relative turning of the shutter and disc to vary the size of the shutter opening, a shutter opening control adapted to vary said relative turning of the shutter and disc, a shaft for dependently rotating the shutter and disc, a motor for rotating the shaft, and a control for varying the motor speed; the said attachment comprising a manually movable member, means for adjusting the motor speed control by movement of said member, a rotatable shaft, means for rotating the shaft by movement of the manually movable member, and means for adjusting the shutter opening control by rotation of the shaft so as to vary the shutter opening in accordance with the shutter speed.

13. An attachment for a motor driven motion picture camera of that type which includes a shutter, a disc adapted for rotation with the shutter and also adapted for relative turning of the shutter and disc to vary the size of the shutter opening, a shutter opening control adapted to vary said relative turning of the shutter and disc, a shaft for dependently rotating the shutter and disc, a motor for rotating the shaft, and a control for varying the motor speed; the said attachment comprising a manually movable member, means for adjusting the motor speed control by movement of said member, a cam carried by said member, an actuating element, means for actuating said element by movement of the cam, and means for adjusting the shutter opening control by actuation of said element so as to vary the shutter opening in accordance with the shutter speed.

14. An attachment for a motor driven motion picture camera of that type which includes a shutter, a disc adapted for rotation with the shutter and also adapted for relative turning of the shutter and disc to vary the size of the shutter opening, a shutter opening control adapted to vary said relative turning of the shutter and disc, a shaft for dependently rotating the shutter and disc, a motor for rotating the shaft, and a control for varying the motor speed; the said attachment comprising a housing, means for detachably clamping the housing to the motor so that the housing overlies the motor speed control, a manually movable member at the exterior of the housing, means in the housing for adjusting the motor speed control by movement of said member, and means extending from the interior of the housing to the shutter opening control for adjusting said shutter opening control by said movement of the manually movable member so as to vary the shutter opening in accordance with the shutter speed.

In testimony whereof, they have affixed their signatures to this specification.

VICTOR R. RABY.
DWIGHT W. WARREN.